May 16, 1961     R. M. STOLZE     2,984,787
PULSE ENERGY METER
Filed Jan. 29, 1958
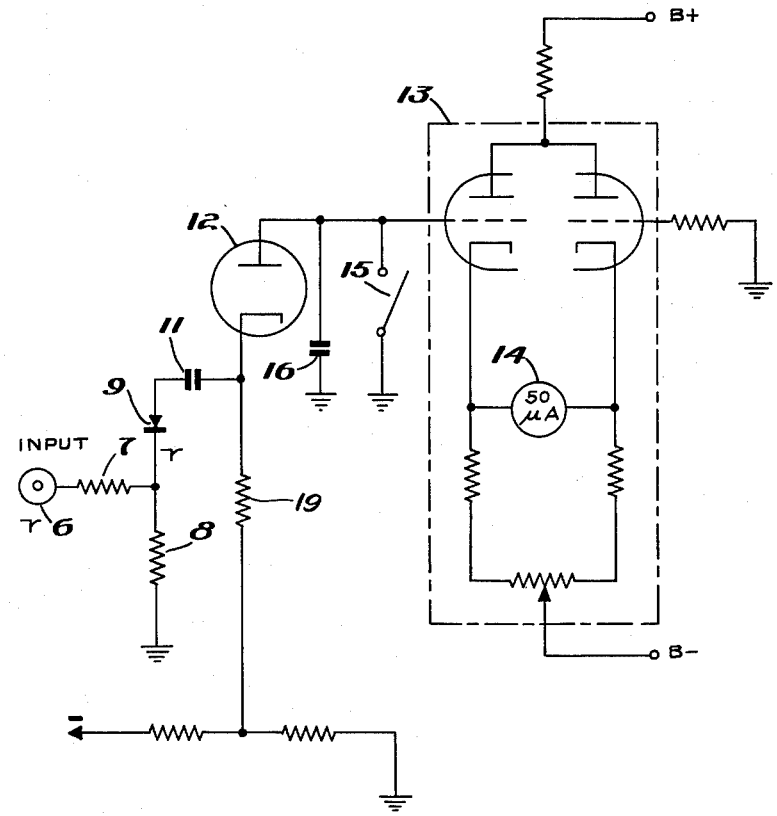
INVENTOR.
ROGER M. STOLZE
BY
ATTORNEYS

2,984,787

PULSE ENERGY METER

Roger M. Stolze, Marion, Iowa, assignor to Collins Radio Company, Cedar Rapids, Iowa, a corporation of Iowa Filed Jan. 29, 1958, Ser. No. 711,974

1 Claim. (Cl. 324—102)

This invention relates to metering systems, and more particularly to a metering system which is capable of rapidly and accurately measuring the energy in a pulse.

In the prior art it has been necessary in order to measure the energy in a particular pulse to use an oscilloscope for measurement of the pulse, and then by a process of integration calculate the amount of energy contained in the pulse. This system of measuring the energy in a pulse is very time consuming. This invention provides a metering system which can rapidly and accurately indicate the energy in a pulse on the face of a meter.

The invention provides a system where the integration is performed within the circuit elements so that the energy contained in a pulse which is applied to the system can be read directly on the face of the meter. This system of measuring the energy contained in a pulse is accurate and economical in construction.

An object of this invention is to provide a direct-reading device which will indicate in ergs the energy in an applied pulse.

A further object of this invention is to provide a pulse energy measuring system which is economical to construct and which posseses the requisite amount of accuracy.

These and other objects of this invention will become apparent when the following description is read in conjunction with the accompanying drawing, which consists of a single figure illustrating schematically one embodiment of this invention.

The input signal in the embodiment of this invention shown in the figure is applied on the input lead 6. The input signal is then divided between the resistance element 7 and the resistance element 8. The resistance element 7 is approximately 80 times the value of the resistance element 8. As a result of the voltage divider action of the resistance elements 7 and 8 a small proportion of the pulse voltage which is applied to the input terminal 6 is applied to the cathode of the crystal 9. The crystal 9 is a crystal diode which for small values of applied voltage acts as a square-law detector. In a square-law detector the current through the detector is directly proportional to the square of the applied voltage. In this particular instance the current which passes through the crystal diode 9 is proportional to the square of the voltage applied to the cathode of the crystal diode 9. When the crystal diode 9 conducts electrons will collect on one side of the capacitance element 11 as shown in the figure. These electrons will collect on the side of the capacitance connected to the crystal diode.

As is well known, an equal number of electrons are driven from the other side of the capacitor and thence to the cathode circuit of the diode 12. The electron flow just described in the cathode circuit drives the cathode of the diode 12 negative and thus causes current flow in the diode 12. The current flow through the diode 12 charges capacitance 16 negatively. The electron charge of the capacitance 16 is equal to the time integral of the instantaneous current through the plate circuit of diode 12. Due to the square-law behaviour of the crystal diode 9 the instantaneous current through the diode 12 is proportional to the square of the instantaneous applied voltage pulse on the input terminal 6. The voltage at the plate of the diode 12, or the voltage to which capacitance 16 is charged, is proportional to the energy contained in the applied pulse. Due to the large back impedance of the diode 12 no appreciable amount of the charge on the capacitor 16 can leak back through the diode 12. The voltage on the plate circuit of diode 12 when applied to the balanced bridge meter circuit 13 will indicate directly the energy of the input pulse. It is to be noted that since diode 9, capacitor 11, tube 12, and capacitor 16 form a series circuit, (resistor 19 being quite large), substantially all of the current flow through the diode 9 will go to charge capacitor 16.

The balanced bridge meter circuit 13 is well known in the art, and the microammeter 14 merely reads the value of the energy of the applied pulse. This microammeter will necessarily have to be calibrated so that it will read the energy of the input signal accurately and directly. One method which may be used to calibrate the meter 14 is to rapidly discharge a capacitor of a known value which has been charged to a known voltage into the input terminal 6. The power or energy which is applied to the input terminal will then be known and this value of energy may be marked upon the meter. Repeating this process for a number of values provides a meter which reads the energy of an input signal directly in ergs.

As is obvious from the drawing, this invention may be used to check either positive or negative pulses merely by reversing the diodes, the diode bias voltage, and the meter. It is also necessary in the particular embodiment of this invention to ground the grid of the triode in the balanced bridge circuit 13. The charge or voltage which is applied to the grid of the tube in the balanced bridge meter circuit 13 must be bled off to ground so that the energy of the next pulse may be detected.

Switch 15 is provided to eliminate the charge on the grid and the capacitance element 16. Since the voltage to which the capacitance 11 charges is proportional to the electron charge on the capacitance, the voltage at the plate of diode 12 is proportional to the energy contained in the input pulse. The capacitance 16 is charged in the opposite direction from the capacitance 11. The charge on capacitance 16 is also proportional to the square of the voltage applied on the input terminal 6.

Although this invention has been described with respect to a particular embodiment thereof, it is not to be so limited as changes and modifications may be made therein which are within the full intended scope of the invention as defined by the appended claim.

What is claimed is:

A direct reading meter system for measuring the energy in a pulse, comprising input means having input pulse signals applied thereto, voltage divider means connected across said input means, circuit means connected across at least a portion of said voltage divider means, said circuit means comprising detector means connected to a first terminal of said portion of said voltage divider means and constructed and arranged to produce current flow therethrough proportional to the square of the input pulse signal voltage applied across said voltage divider means, an electron discharge device comprising a cathode electrode and an anode electrode and having a large reverse impedance compared to the reverse impedance of said detector means and being poled in the same polarity as said detector means with respect to said input pulse signals, first capacitor means connected between said detector means and one of said electrodes of said electron discharge device, said electron discharge device responsive to the charge on said first capacitor means to become conductive and provide a path for the current flow through said detector means, and second capacitor means connected between the other electrode of said electron discharge device and the second terminal of said portion of said voltage divider means, said second capacitor means responsive to the current flow through said detector means, said first capacitor means, and said electron discharge device to accumulate a charge thereon proportional to said current flow, and means including meter means connected across said second capacitor means for measuring the charge on said second capacitor means.

References Cited in the file of this patent

UNITED STATES PATENTS

| | | |
|---|---|---|
| 1,907,487 | Booth | May 9, 1933 |
| 2,162,239 | Beuermann | June 13, 1939 |
| 2,571,458 | Lawrence et al. | Oct. 16, 1951 |
| 2,582,851 | Ruge | Jan. 15, 1952 |
| 2,654,860 | Lewis | Oct. 6, 1953 |
| 2,763,837 | Follingstad | Sept. 18, 1956 |

FOREIGN PATENTS

| | | |
|---|---|---|
| 649,839 | Germany | Sept. 4, 1937 |

OTHER REFERENCES

Sauber: "Square-Law Detector" "Electronics," vol. 29, No. 3, pages 170–172; pub. date November 1955.

Terman & Pettit: "Electronic Measurements," 2nd ed. September 1–13, McGraw-Hill Inc., New York, N.Y.